(12) United States Patent
Bland et al.

(10) Patent No.: US 8,398,346 B2
(45) Date of Patent: Mar. 19, 2013

(54) DROP-IN ANCHOR

(75) Inventors: T. J. Bland, White Plains, NY (US); Robert La Barbera, New Rochelle, NY (US)

(73) Assignee: Black & Decker Inc., Newark, DE (US)

( * ) Notice: Subject to any disclaimer, the term of this patent is extended or adjusted under 35 U.S.C. 154(b) by 223 days.

(21) Appl. No.: 12/813,150

(22) Filed: Jun. 10, 2010

(65) Prior Publication Data

US 2010/0303577 A1 Dec. 2, 2010

(51) Int. Cl.
*F16B 13/06* (2006.01)

(52) U.S. Cl. .............. 411/45; 411/57.1; 411/13; 29/424; 29/525.01

(58) Field of Classification Search ............... 411/45, 411/57.1, 13, 14; 29/424, 522.1, 525.01, 29/525.02
See application file for complete search history.

(56) References Cited

U.S. PATENT DOCUMENTS

| 2,370,327 | A | * | 2/1945 | Rosan | 411/80.2 |
|---|---|---|---|---|---|
| 3,561,317 | A | * | 2/1971 | Rowell | 411/5 |
| 4,122,753 | A | * | 10/1978 | Kuhlmann et al. | 411/2 |
| 4,402,637 | A | * | 9/1983 | Seghezzi et al. | 411/31 |
| 5,746,556 | A | * | 5/1998 | Sato | 411/42 |
| 5,779,085 | A | * | 7/1998 | Havlinek et al. | 220/234 |
| 7,430,811 | B2 | * | 10/2008 | Williams et al. | 33/501.45 |

* cited by examiner

*Primary Examiner* — Flemming Saether
(74) *Attorney, Agent, or Firm* — Cantor Colburn LLP

(57) ABSTRACT

A drop-in anchor includes a tubular sleeve having a first end and an expandable second end, the sleeve having one or more raised surfaces at the first end. A plug is insertable in the sleeve such that when the plug is driven into an installed position in the sleeve the second end expands and an installation tool interacts with the one or more raised surfaces to provide a visual indication of engagement of the drop-in anchor to a workpiece.

12 Claims, 9 Drawing Sheets

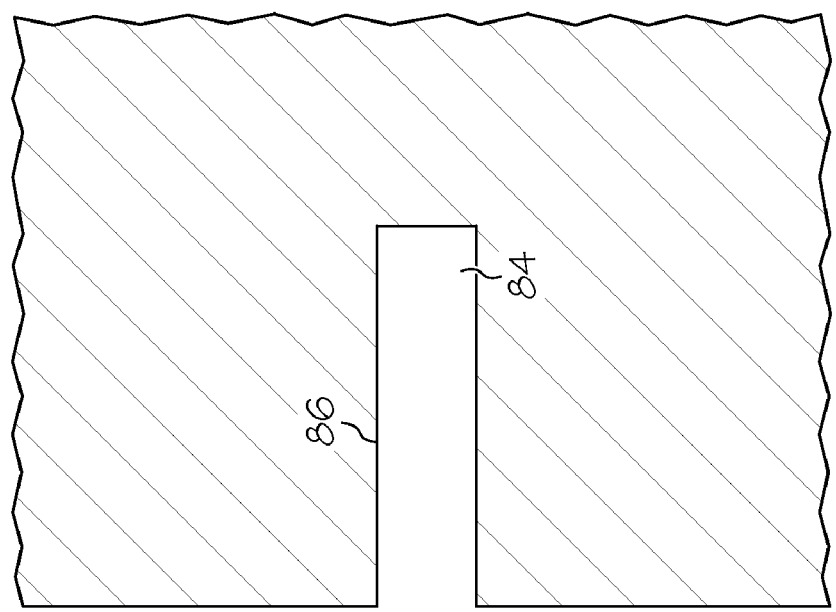
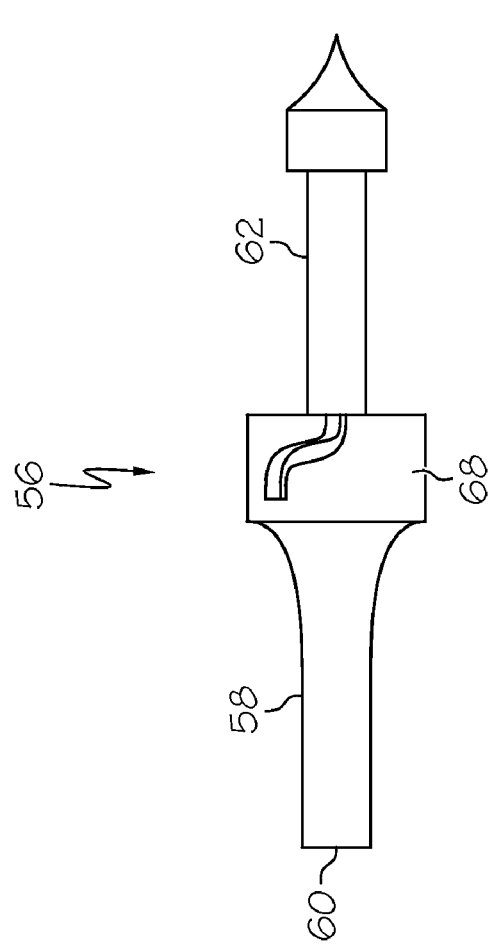
FIG. 7

DROP-IN ANCHOR

BACKGROUND

The subject matter disclosed herein relates to anchor systems. More specifically, the subject disclosure relates to drop in anchors.

Drop-in anchors for use in, for example, fastening items to masonry, typically include a sleeve, which is placed in a pre-drilled hole. A plug is driven into an expandable portion of the sleeve which, when expanded, secures the sleeve in the hole. Items may be secured to the masonry via a threaded end of the sleeve opposite the expandable portion of the sleeve.

In typical drop-in anchors, the plug is frustoconically shaped thereby providing an outer surface substantially matching an inwardly tapering inner wall of the sleeve. This has always been, understandably thought to be the most efficient configuration for a drop-in anchor as the angled surfaces have been understood to work with each other to garner the desired effect while using the angle to make insertion as easy as it can be. Nevertheless, drop-in anchors of the prior art require substantial setting force, normally obtained by the application of a relatively large number of blows with a sledge hammer. The art would well receive a drop-in anchor requiring a lower setting force to set the plug and expand the sleeve.

SUMMARY

A drop-in anchor includes a tubular sleeve having a first end and an expandable second end, the sleeve having one or more raised surfaces at the first end. A plug is insertable in the sleeve such that when the plug is driven into an installed position in the sleeve the second end expands and an installation tool interacts with the one or more raised surfaces to provide a visual indication of engagement of the drop-in anchor to a workpiece.

A method of installing a drop-in anchor in a workpiece includes drilling a hole in the workpiece and inserting a drop-in anchor into the hole. A plug of the drop-in anchor is driven into an installed position with an installation tool thereby engaging the sleeve with the workpiece. The installation tool abrades on one or more raised surfaces of a sleeve of the drop-in anchor when the plug attains the installed position. A coating is removed from the one or more raised surfaces via the abrasion of the installation tool thereon and provides a visual indication to an observer that the sleeve is engaged with the workpiece.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a cross-sectional view of an embodiment of an installation tool configured for drilling;

The detailed description explains embodiments of the invention, together with advantages and features, by way of example with reference to the drawings.

DETAILED DESCRIPTION

Figure 1:
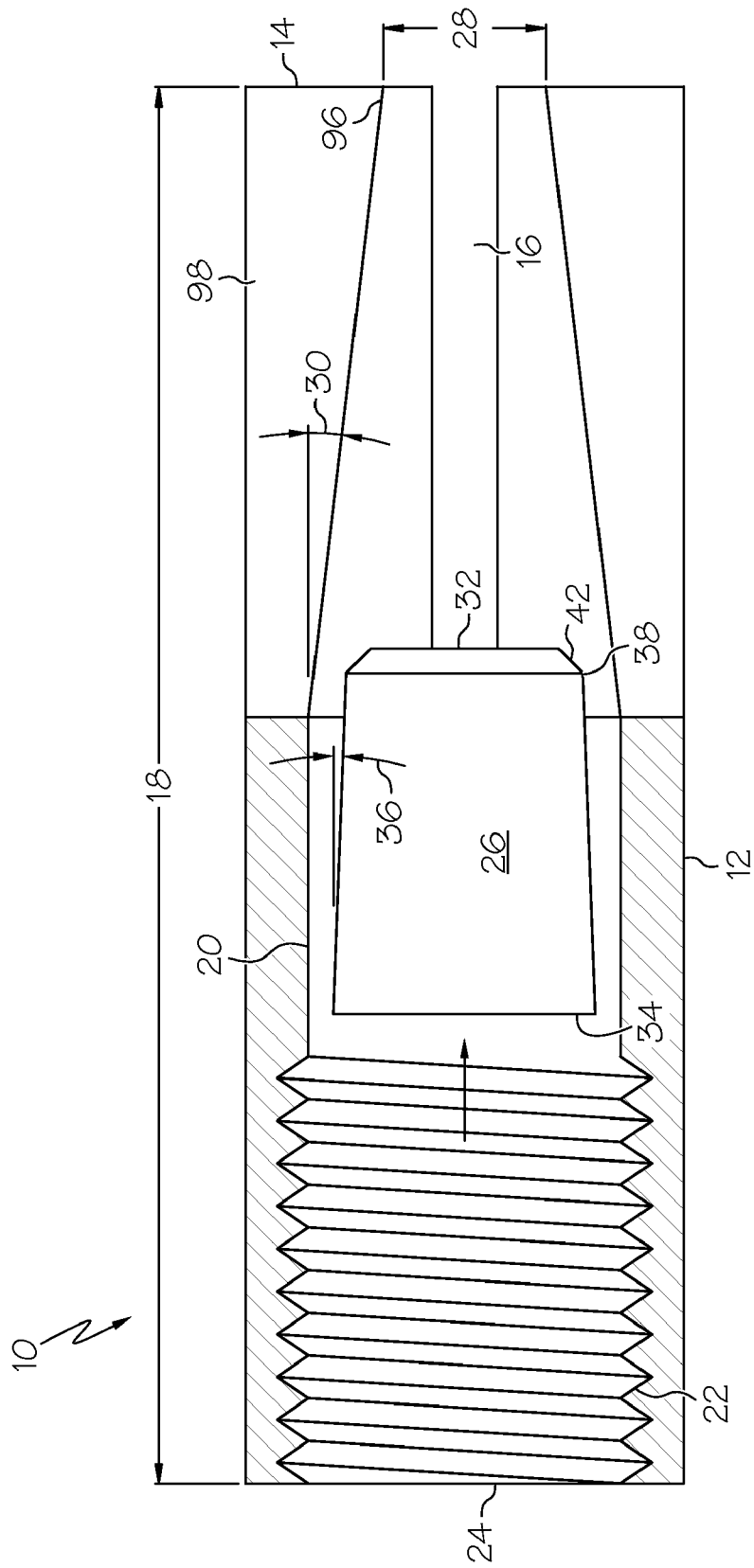
FIG. 1 is a cross-sectional view of an embodiment of a drop-in anchor.

FIG. 1 illustrates an improved drop-in anchor 10. The anchor 10 includes a sleeve 12. The sleeve 12 is substantially tubular and is radially expandable at an expansion end 14. To achieve the expandability, the sleeve 12 includes one or more expansion openings 16 or other similar structure allowing diametric increase of the sleeve at the expansion end 14 extending from the expansion end 14 partially along a length 18 of the sleeve 12. An inner wall 20 in one embodiment of the sleeve 12 includes threads 22 at a threaded end 24 opposite the expansion end 14 to receive a threaded fastener (not shown) to secure desired items to the anchor 10 once the anchor is installed in, for example, concrete masonry. It is to be understood that although it is common for drop-in type anchors to bear box threads (i.e. threads at an inside surface of the sleeve 12) it is also possible to place the threads 22 at an outside surface of the sleeve 12 providing the sleeve 12 is configured to extend beyond a surface of the masonry (proud of the surface of the masonry) when installed.

The anchor 10 includes a plug 26, which is insertable into the sleeve 12 from the threaded end 24. In some embodiments, a diameter of the sleeve 12 at the expansion end 98 is such that the plug 26 is only insertable in the sleeve 12 from the threaded end. An inner diameter 28 of the sleeve tapers in an expansion portion 98 or decreases at a sleeve angle 30 from the threaded end 24 to the expansion end 14 so that the plug 26 is in an interference fit with the sleeve 12 in the expansion portion 98, so that when the plug 26 is driven toward the expansion end 14, the expansion portion 98 expands to secure the sleeve 12 in the concrete masonry. In some embodiments, the expansion end 14 includes a substantially cylindrical end portion 96 having a diameter 28, The plug 26 has a tip end 32 located closest to the expansion end 14 and a head end 34 located closest to the threaded end 24, and in some embodiments may be substantially cylindrical from the tip end 32 to the head end 34. In other embodiments, the plug 26 has a slight taper at a plug angle 36 from the head end 34 to the tip end 32.

Figure 2:
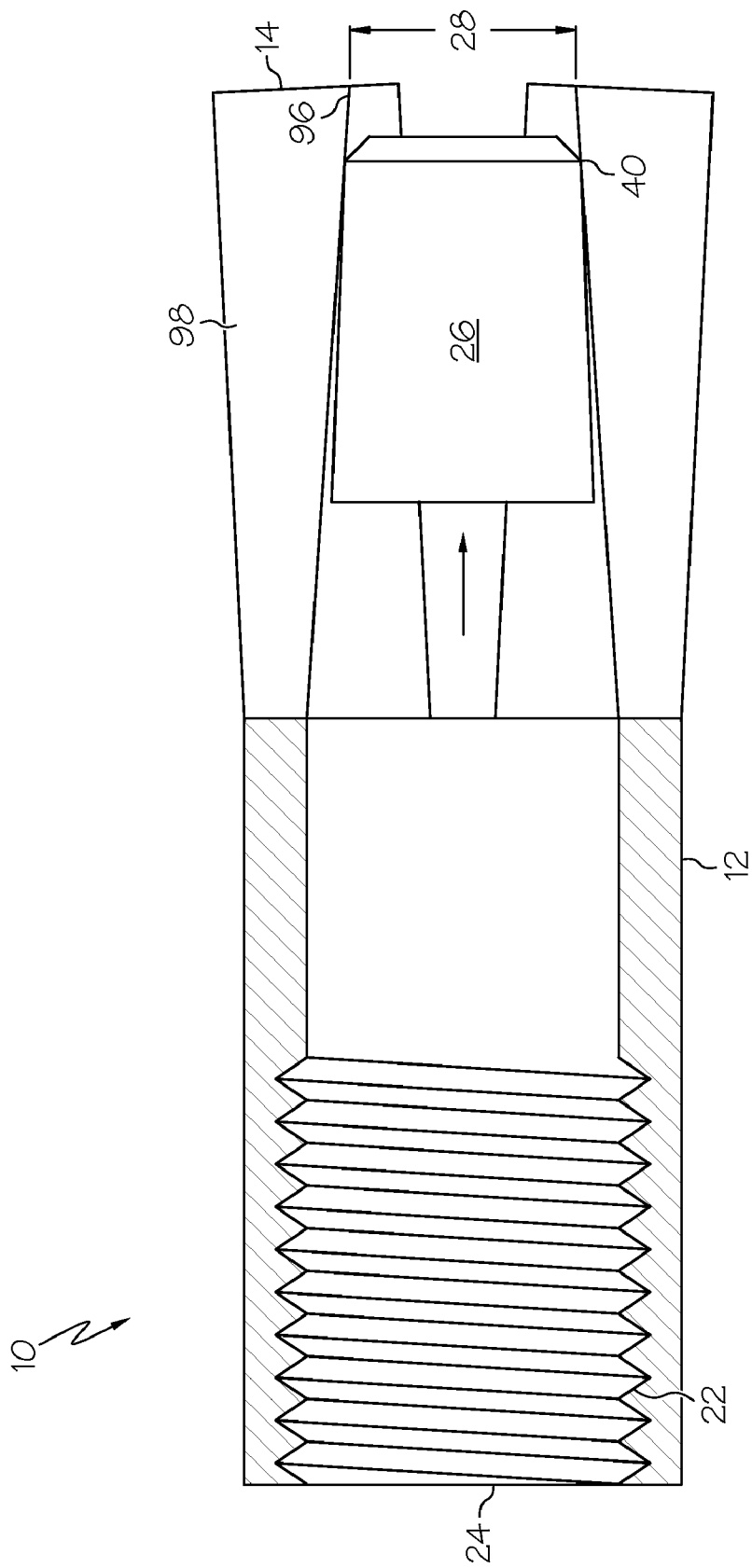
FIG. 2 is a cross-sectional view of an embodiment of a drop-in anchor with the plug in an installed position.

The plug angle 36 and the sleeve angle 30 are substantially dissimilar, with the sleeve angle 30 being greater than the plug angle 36, such that a contact area 38 between the plug 26 and the sleeve 12 is reduced over that of prior art drop-in anchors. In some embodiments, the contact 38 may be substantially an annular, planar contact 38. A difference between sleeve angle 30 and the plug angle 36 determines the size of the contact area 38. In some embodiments, the difference between the sleeve angle 30 and the plug angle 36 is about 1 degree or greater, for example 1.5 degrees. This assures a minimal contact area 38 between the sleeve 12 and the plug 26. Reduction of the contact area 38 reduces friction between the sleeve 12 and the plug 26 thereby reducing an amount of force required to set the plug 26 in an installed position 40, shown in FIG. 2. Once the plug 26 is driven to the installed position 40, however, the difference between the sleeve angle 30 and the plug angle 36 is substantially zero due to the deformation of the expansion portion 98. In some embodiments, the tapered portion of the plug 26 is located at the cylindrical end portion 96 when in the installed position 40 so as not to limit full expansion of the sleeve 12 when the plug 26 is driven to the installed position 40.

In some embodiments, the friction is reduced enough such that the plug 26 may be driven into the installed position 40 by a number of blows with a sledge hammer or even a standard 16 or 20 ounce hammer that is substantially fewer than was necessary in the prior art. Moreover, in some embodiments, a conventional rotary hammer drill (not shown) maybe employed to successfully set the drop-in anchor without the use of any other driving means. It is to be appreciated, however, that any suitable setting tool may be utilized. These embodiments may include those between about ¼" and ¾" in diameter. Further, because of the lack of taper in the plug 26, when the plug 26 is driven toward the expansion end 14 the plug 26 deforms the material of the expansion portion 98 directly radially outwardly in contrast to prior art tapered plugs 26 in which the sleeve material bends around the taper of the plug. This results in an expanded sleeve 12 which has a substantially linear outer surface of the expansion portion 98. This linear outer surface sleeve 12 increases ultimate loads which the drop-in anchor 10 is capable of withstanding, when compared to a prior art anchor having a tapered plug of similar maximum diameter.

Referring again to FIG. 1, the tip end 32 of the plug 26 may include a chamfer 42. The chamfer 42 is included to encourage the plug 26 to move into the installed position 40 more easily by preventing the plug 26 from snagging on the inner wall 20 of the sleeve 12 when driven. The chamfer 42 is small enough such that no expansion is lost due to the reduction in diameter of the plug 26 due to the presence of the chamfer 42. Further, in some embodiments, the plug 26 is driven into the installed position 40 such that chamfer 42 is located in the cylindrical end portion 96 to preserve maximum expansion of the sleeve 12.

Figure 3:
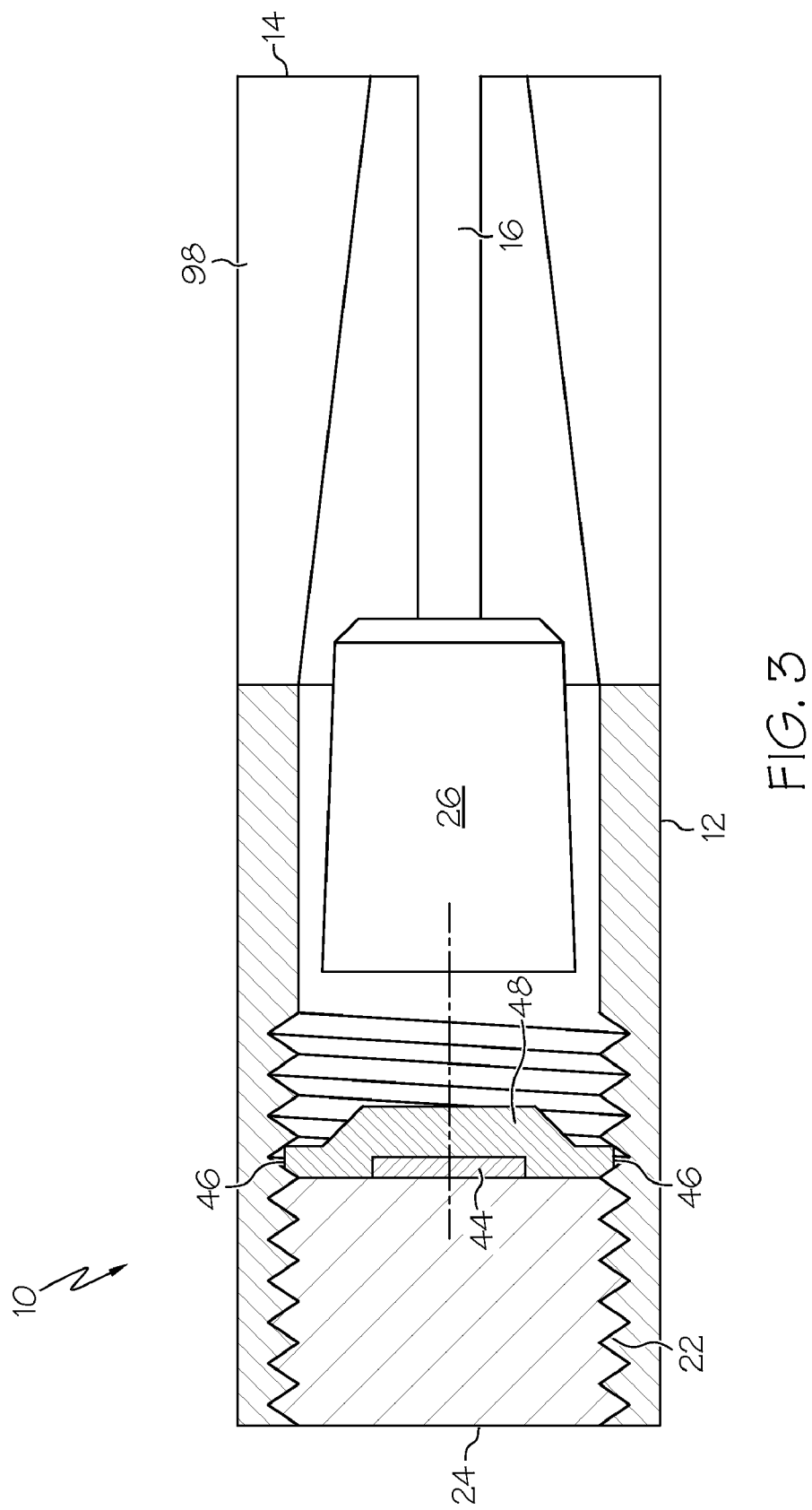
FIG. 3 is a cross-sectional view of an embodiment of a drop-in anchor including a retainer.

Referring now to FIG. 3, some embodiments include a retainer 44. The retainer 44 is inserted into the sleeve 12 from the threaded end 24 after the plug 26 is inserted, to prevent the plug 26 from inadvertently being removed from the sleeve 12 before the plug 26 is driven to set the drop-in anchor 10. More specifically, since the plug 26 is loosely deposited in the sleeve 12, it is not only possible but common for the plug 26 to fall out of the sleeve 12 either in shipping, storage, or just prior to deployment. Such departure of the plug 26 is at least a nuisance and possibly could impact efficiency or success at a job site if the plug 26 is not easily found. The retainer 44 is positioned within the sleeve 12 so that exit of the plug 26 is prevented and may in some instances be urged into the sleeve 12 to a depth therein that prevents or impedes movement of the plug 26 to any appreciable degree. Limitation of movement of the plug 26 as such has the added benefit of reducing noise associated with jostling of the sleeve 12 and plug 26.

The retainer 44 is formed from a relatively durable material that includes at least a property of moisture resistance. In one embodiment the material is a plastic material, for example, polyethylene, although metal, wood, rubber or other suitable materials may be substituted. The retainer 44 is molded or otherwise formed, such as for example stamped, punched, extruded, cut, etc. In some embodiments, the retainer 44 is substantially disc-shaped while in other embodiments other shapes such as part spherical, square, triangular, pentagonal, lenticular, etc. can be substituted without departure from the scope of the disclosure hereof. Ultimately any shape capable of being positioned relative to the sleeve 12 and plug 26 that will prevent or substantially deter plug 26 exit from the sleeve 12 is contemplated. As shown in FIG. 3, the retainer 44 is configured such that an outer periphery 46 of the retainer 44 engages the threads 22 of the sleeve 12 when the retainer 44 is inserted into the sleeve 12. It is to be appreciated, however, that in other embodiments the periphery 46 of the retainer 44 may frictionally engage a thread 22 crest to secure the retainer 44 in the sleeve 12.

Figure 4:
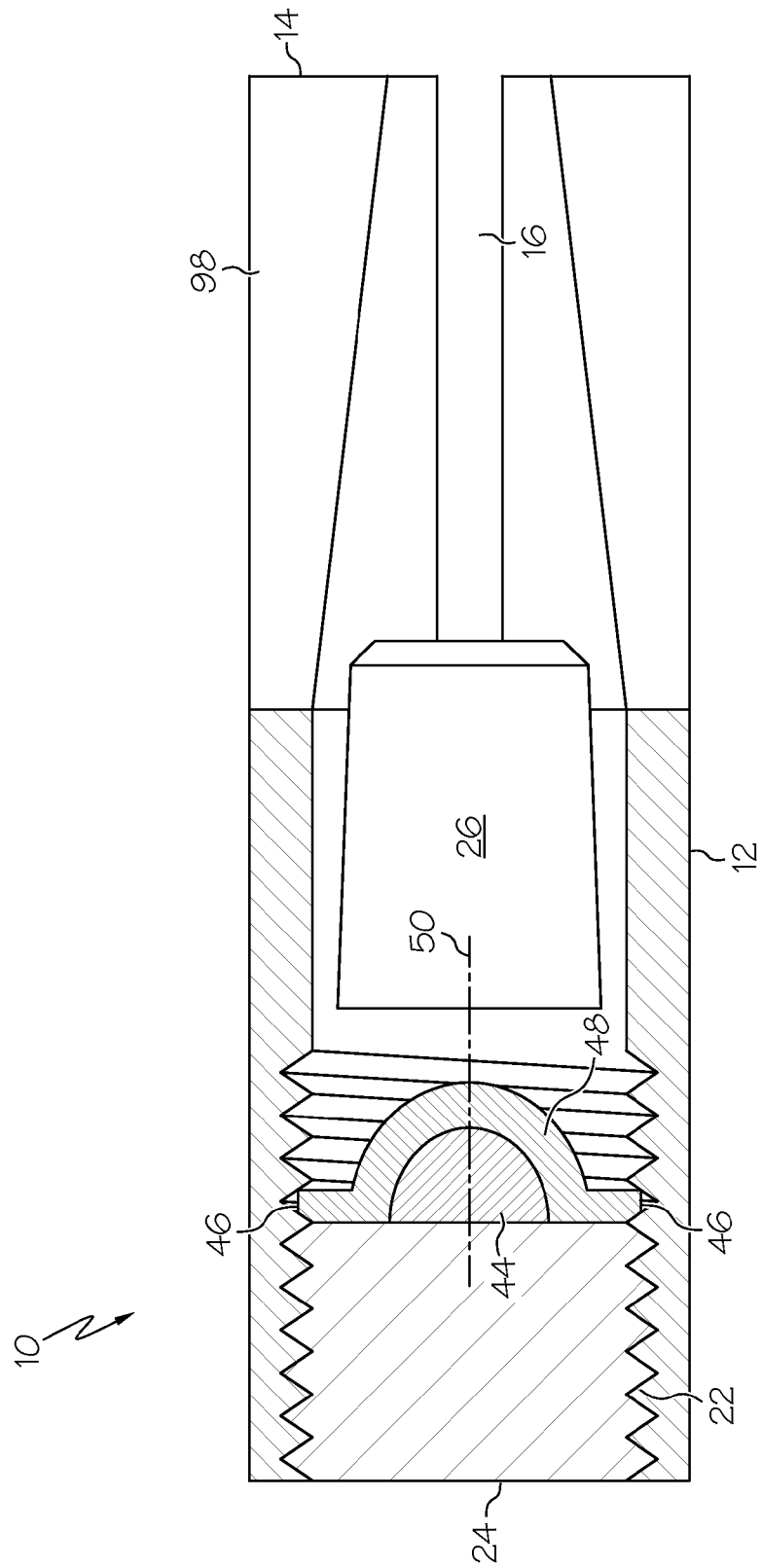
FIG. 4 is a cross-sectional view of another embodiment of a drop-in anchor including a retainer.
Figure 5:
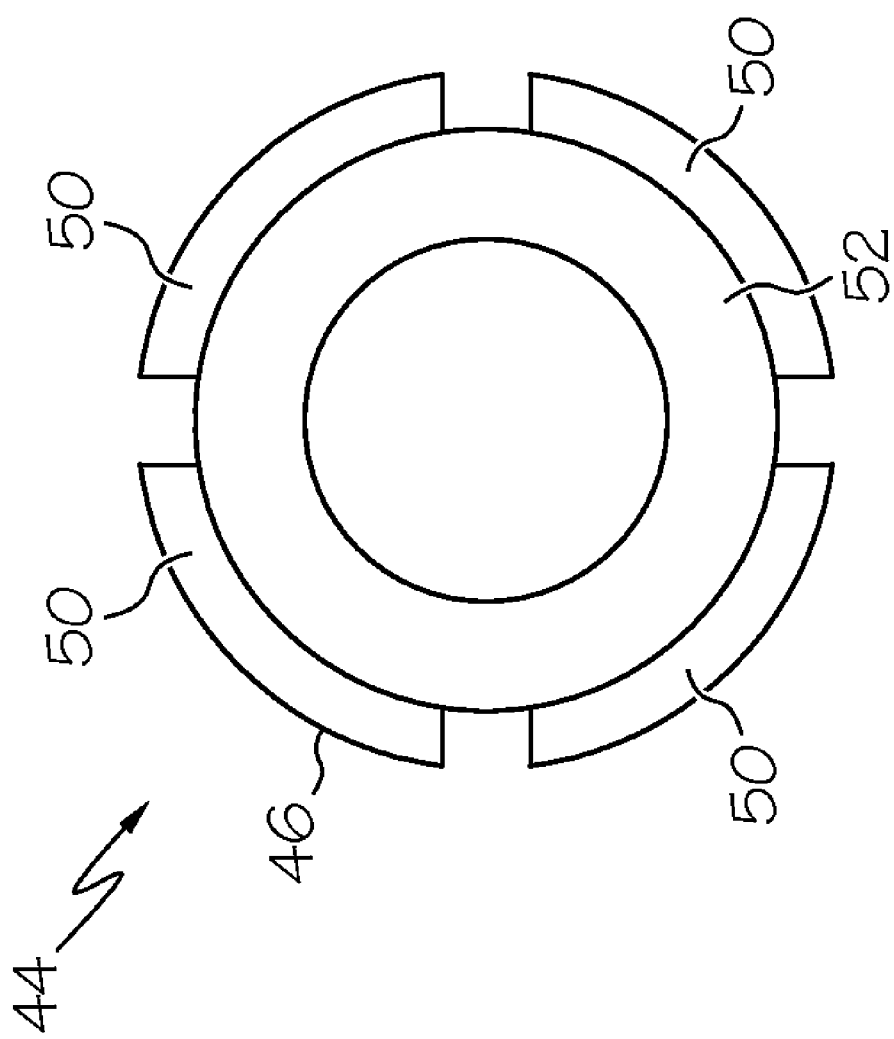
FIG. 5 is a plan view of an embodiment of a retainer.

Some embodiments of the retainer 44 include a protrusion 48 extending out of a plane defined by the periphery 46 of the retainer 44 which in some embodiments is located substantially at a center 50 of the retainer 44. As shown, the protrusion 48 may be frustoconically shaped. In other embodiments the protrusion 48 may have other shapes, for example, as shown in FIG. 4, the protrusion 48 may be at least part spherical. Referring to FIG. 5, in some embodiments the retainer 44 includes one or more fingers 50 extending outwardly from a center portion 52 of the retainer 44. In the embodiment of FIG. 5, the retainer 44 includes four fingers 50 equally spaced around the retainer 44. It is to be appreciated that in other embodiments, other quantities of fingers 50 may be included, for example, three, six or eight fingers 50. The fingers 50 make the outer periphery 46 of the retainer 44 more pliable allowing for surer engagement of the retainer 44 to the helical threads 22 of the sleeve 12. In addition, because structure of the fingers 50 necessarily form a break in the material, the crossing of threads 22 of the sleeve 12 by the retainer 44 is not required. Rather, the fingers 50 can each fully engage in a thread 22 trough without extending over a thread 22 crest. The fingers 50 further decrease an amount of force necessary to set the plug 26 with the retainer 44 installed relative to a retainer 44 without fingers 50. The astute reader will also appreciate based upon the foregoing that a single break in the periphery 46 of the retainer 44 will also achieve the result of full engagement and avoidance of thread 22 crest crossing.

Figure 6:
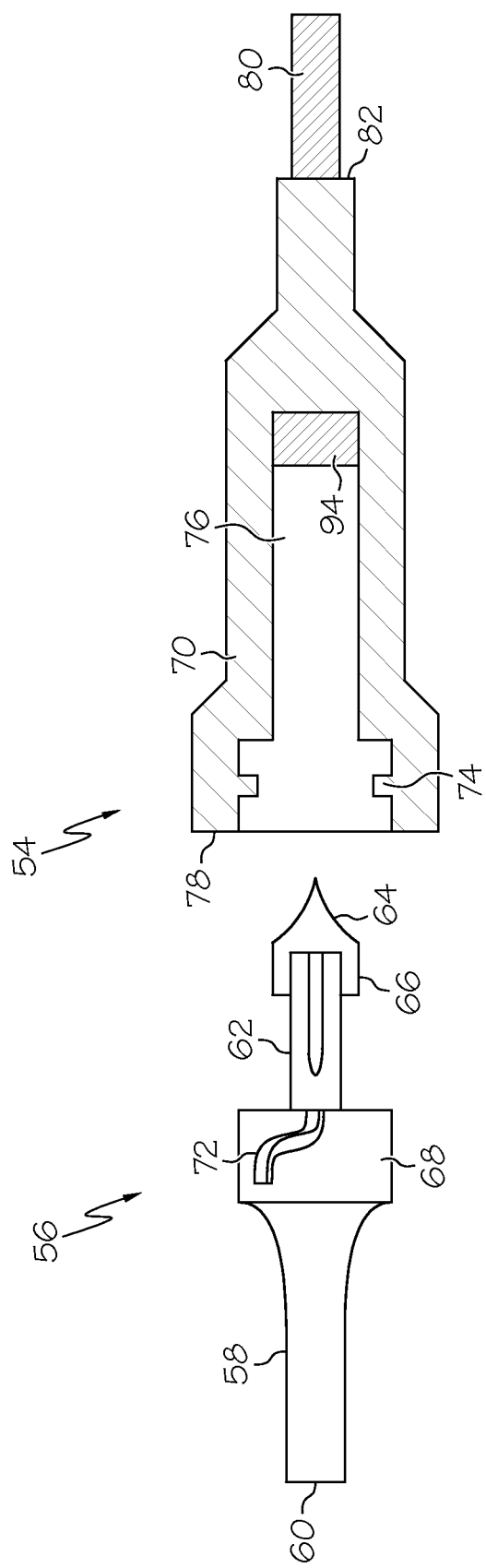
FIG. 6 is a cross-sectional view of an embodiment of an installation tool.

Referring now to FIG. 6, some embodiments of the drop-in anchor 10 are configured to be installed by a unique installation tool 54. The installation tool 54 includes a drill bit 56. The drill bit 56 includes a shaft 58 disposed at a connection end 60, which is configured to be installed in a chuck (not shown) of, for example, a conventional rotary hammer drill (not shown). A drill end 62 is configured as a drill, with a pointed tip 64 and flutes 66. A bit collar 68 is located between the drill end 62 and the connection end 60.

The installation tool 54 includes a tool sleeve 70 which is securable over the drill bit 56 and includes a tool pocket 76 at a first end 78 of the tool sleeve 70. The tool pocket 76 is a substantially tubular, and in some embodiments, cylindrical structure into which the drill bit 56 is insertable and securable. To secure the tool sleeve 70 to the drill bit 56, some embodiments include one or more elements at the bit collar 68, for example, one or more slots 72 which are engageable with one or more protrusions 74 (pins, bars, etc.) of the tool sleeve 70 extending inwardly into the tool pocket 76. The one or more slots 72 may be of any shape along their length so as promote retention of the one or more protrusions 74 therein, for example, j-shaped, z-shaped, s-shaped, etc. In some embodiments, the protrusion and slot arrangement may be substantially reversed, with the protrusions 74 extending outwardly from the bit collar 68 and receivable in a slot 72 disposed in the tool sleeve 70. While one slot 72 is shown, it is to be appreciated that other quantities of slots 72 and protrusions 74, for example, two, three or more slots 72 and protrusions 74 may be used. Further, some embodiments include a biasing member 94 located in the tool pocket 76 to bias the drill bit 56 away from the tool sleeve 70 to aid in securing the protrusions 74 in the slots 72. The biasing member 94 shown is a block of resilient material, for example, rubber. It is to be appreciated that other types of biasing members 94, for example, a spring located in the tool pocket 76 are also contemplated within the present scope. While a protrusion and slot connection arrangement between the tool sleeve 70 and the drill bit 56 is described herein, it is merely exemplary and other connection arrangements are contemplated within the scope of the present disclosure. The tool sleeve 70 includes a setting tool tip 80 located at a second end 82 of the tool sleeve 70. The tool tip 80 is, when the tool sleeve 70 is installed over the drill bit 56, used to drive the plug 26 into the installed position 40 thus expanding the sleeve 12.

Figure 8:
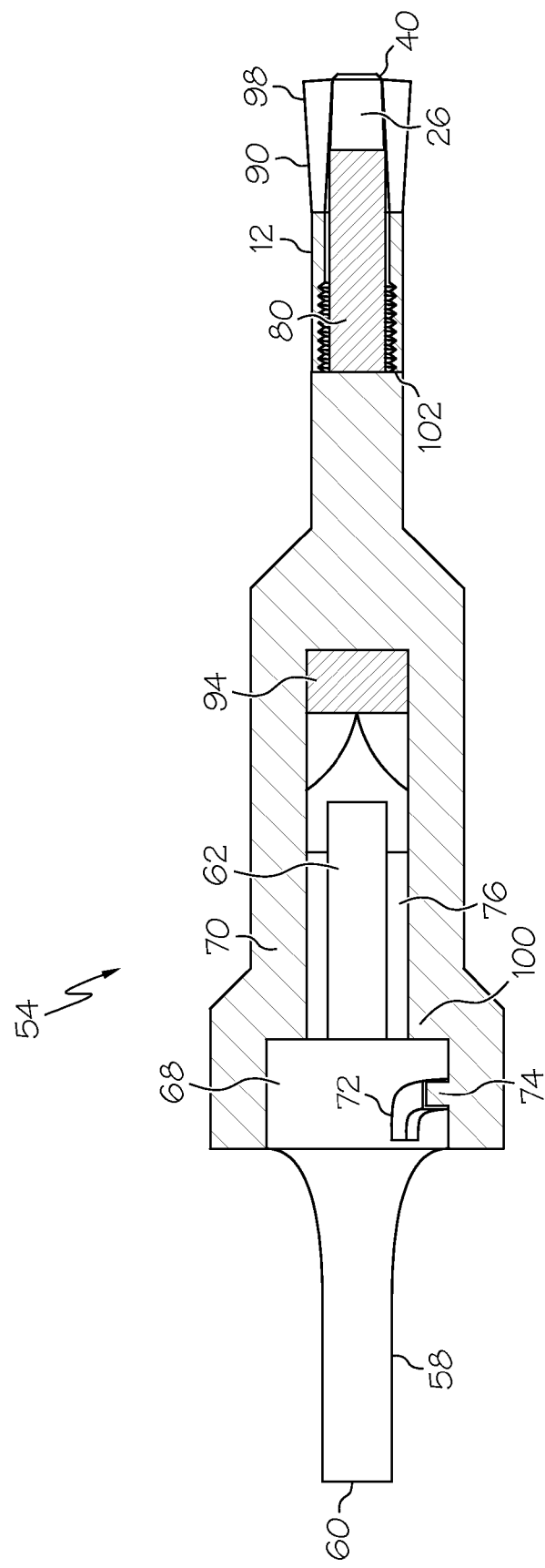
FIG. 8 is a cross-sectional view of an embodiment of an installation tool configured to drive a plug.

The installation tool 54 is utilized to install a drop-in anchor 10 as shown in FIGS. 7 and 8. Initially, the shaft 58 is installed into and secured to the chuck. The drill bit 56 is then utilized to drill a hole 84 sized to receive the drop-in anchor 10.

Once the drop-in anchor 10 is inserted into the hole 84, the plug 26 must be driven into the installed position 40, which causes the sleeve to expand and engage a wall 86 of the hole 84. The tool sleeve 70 is then installed over the drill bit 56 by inserting the drill bit 56 into the tool pocket 76 and inserting the protrusions 74 into the slots 72 to secure the tool sleeve 70 over the drill bit 56. In some embodiments, when the protrusions 74 are engaged in the slots 72, the bit collar 68 seats on a tool sleeve flange 100. The plug 26 is driven into the installed position 40 by utilizing the installation tool 54 in this configuration via the tool tip 80. To drive the plug 26 into the installed position 40, force is transferred through the drill bit 56 an into the tool sleeve via the collar 70 and tool sleeve flange 100 to the tool tip 80 which acts on the plug 26. The installation tool 54 disclosed herein requires only installing the installation tool 54 into the chuck a single time during the installation process and allows the hole 84 to be drilled by the drill bit 56 then the drop in anchor 10 installed using the tool sleeve 70 without installing a second tool in the chuck, for a simpler, faster installation process requiring less time for tool changeover between drilling the hole 84 and setting the plug 26.

Figure 9:
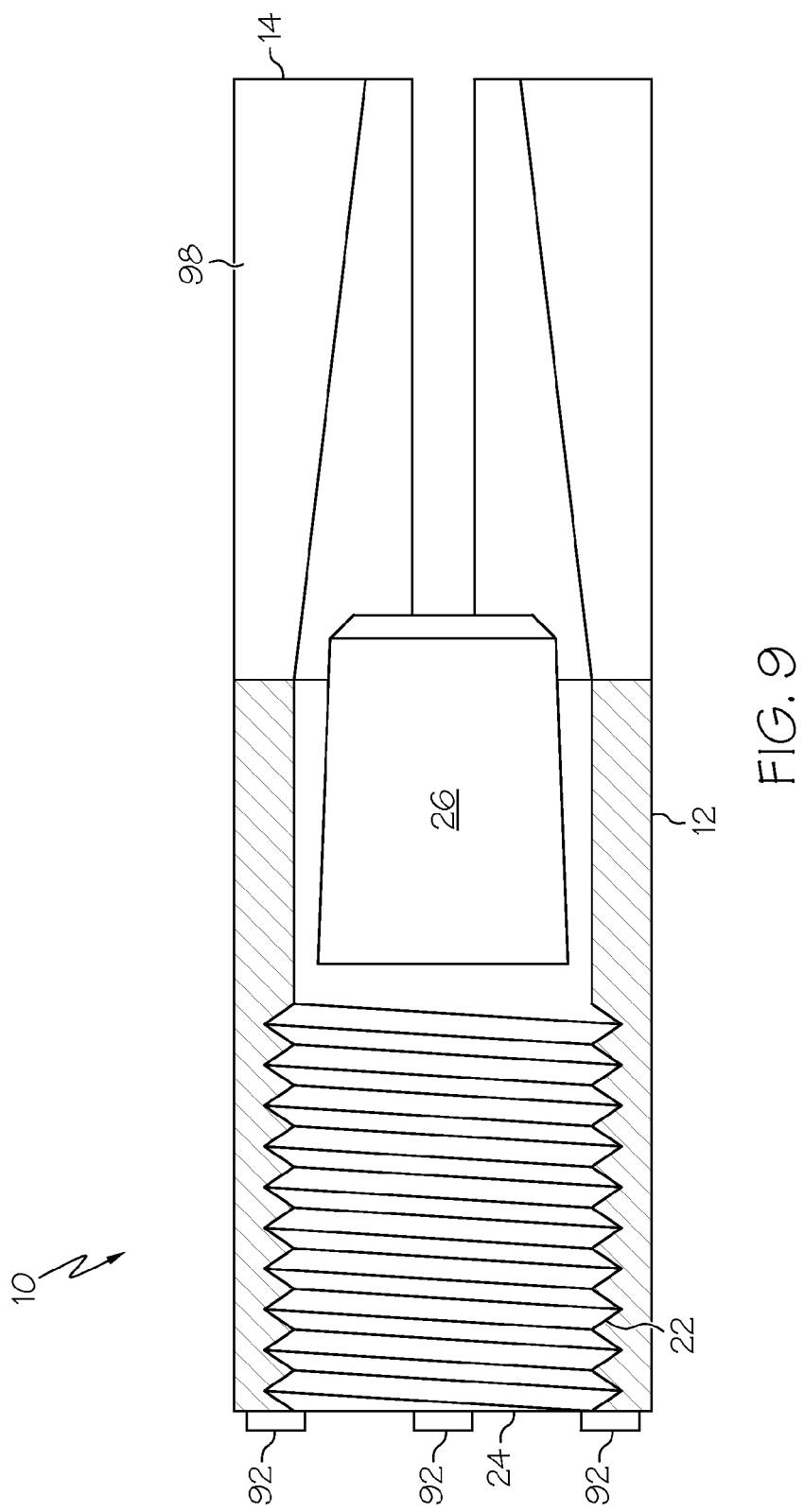
FIG. 9 is a cross-sectional view of another embodiment of a drop-in anchor.

In some embodiments, as shown in FIG. 9, the sleeve 12 includes one or more raised elements, for example, castelations 92 at an exterior of the threaded end 24. FIG. 9 illustrates four castelations 92 equally spaced around the threaded end 24, but it is to be appreciated that other embodiments of the drop-in anchor 10 may utilize other quantities and/or spacing of the castelations 92. Prior to driving the plug 26 to the installed position, for example, at manufacture of the sleeve 12, at least a portion of the sleeve 12 including the castelations 92 are coated with a coating having a color that contrasts with a color of the base material of the sleeve 12. In some embodiments, the coating is a blue paint. It is to be appreciated, however, that the use of blue paint is merely exemplary, and that other colors of paint and/or other types of coatings may be utilized. When the plug 26 is driven to the installed position, bit tip 80 is of a length such that when the plug 26 attains the installed position 40, a bit shoulder 102 is configured to come into contact with the castelations 92. As the bit shoulder 102 rotates relative to the sleeve via action of the rotary hammer drill, or the like, while in contact with the castelations 92, the coating is abraded from the castelations to reveal the sleeve 12 color beneath the coating. Removal of the coating by the bit shoulder 102 serves as a visual indicator to an observer that the drop-in anchor 10 is engaged in the masonry. In other embodiments, the visual indicator may be, for example, deformation of the raised elements by the installation tool or a change in color of a coating applied to the raised elements from contact with a reactionary coating on the setting tool, or a heated element on the setting tool, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A drop-in anchor comprising:
    a tubular sleeve having a first end and an expandable second end, the sleeve including one or more raised surfaces having a substantially planar surface at the first end, at least one of the one or more raised surfaces including a coating on the substantially planar surface; and
    a plug insertable in the sleeve, wherein when the plug is driven into an installed position in the sleeve the second end expands, the tubular sleeve being configured and disposed to interact with an installation tool that removes at least a portion of the coating from the substantially planar surface of the one or more raised surfaces to provide a visual indication of engagement of the drop-in anchor to a workpiece.

2. The drop-in anchor of claim 1, wherein the coating is a paint.

3. The drop-in anchor of claim 2, wherein the paint is a shade of blue.

4. The drop-in anchor of claim 1, wherein the coating is applied to the sleeve at a time of manufacture of the sleeve.

5. The drop-in anchor of claim 1, wherein the one or more raised surfaces are one or more castelations.

6. The drop-in anchor of claim 5, wherein the one or more castelations are four castelations.

7. A method of installing a drop-in anchor in a workpiece comprising:
    drilling a hole in the workpiece;
    inserting a drop-in anchor into the hole;
    driving a plug of the drop-in anchor into an installed position with an installation tool thereby engaging the sleeve with the workpiece;
    abrading the installation tool on one or more raised surfaces having a substantially planar surface at an end of a sleeve of the drop in anchor when the plug attains the installed position;
    removing a coating from the substantially planar surface of the one or more raised surfaces via the abrasion of the installation tool thereon, the removal of the coating providing a visual indication to an observer that the sleeve is engaged with the workpiece.

8. The method of claim 7, wherein the coating is of a color contrasting with a color of the sleeve.

9. The method of claim 7, wherein the coating is a blue paint.

10. The method of claim 7, wherein the coating is removed via abrasion with a collar of the installation tool.

11. The method of claim 7, wherein the one or more raised surfaces are one or more castelations.

12. The method of claim 11, wherein the one or more castelations is four castelations.

* * * * *

UNITED STATES PATENT AND TRADEMARK OFFICE
CERTIFICATE OF CORRECTION

PATENT NO. : 8,398,346 B2
APPLICATION NO. : 12/813150
DATED : March 19, 2013
INVENTOR(S) : T. J. Bland et al.

It is certified that error appears in the above-identified patent and that said Letters Patent is hereby corrected as shown below:

In the Specification

Col. 1, line 19, should read "...have been understood to work with each other to garner the...".

Signed and Sealed this
Thirteenth Day of August, 2013

Teresa Stanek Rea
*Acting Director of the United States Patent and Trademark Office*